Nov. 5, 1946.   P. VALENTINE   2,410,467
CIRCULAR SAW DEVICE
Filed May 11, 1945

INVENTOR.
Patrick Valentine
BY
ATTORNEY

Patented Nov. 5, 1946

2,410,467

UNITED STATES PATENT OFFICE 2,410,467

CIRCULAR SAW DEVICE

Patrick Valentine, New York, N. Y.

Application May 11, 1945, Serial No. 593,178

1 Claim. (Cl. 143—157)

(Granted under the act of March 3, 1883, as amended April 30, 1928; 370 O. G. 757)

This invention relates to a safety device for use in conjunction with circular power saws.

In conducting ripping operations on narrow pieces of stock, it is common practice to feed the work into the saw by pushing it with a piece of scrap wood, the saw blade cutting well into the pushing block or stick before it cuts completely through the work piece. If the attention of the operator strays he may allow the saw to cut completely through the pushing block and into his hand, or if his hand slips from the pushing block it may move directly into the saw.

It is an object of this invention to provide a safety device for holding and impelling work during ripping operations with a power saw, with which device the hand of the operator moves in a path parallel to that of the work piece but offset therefrom sufficiently to preclude contact between the hand and the saw.

Another object of this invention is to provide a safety device of the character described, in the use of which the direction of movement of the operator's hand is not toward the cutting edge of the saw.

Still another object of this invention is to provide a safety device of the character described which is adapted to hold and impel pieces of stock of varying thicknesses without adjustment.

Figure 1:
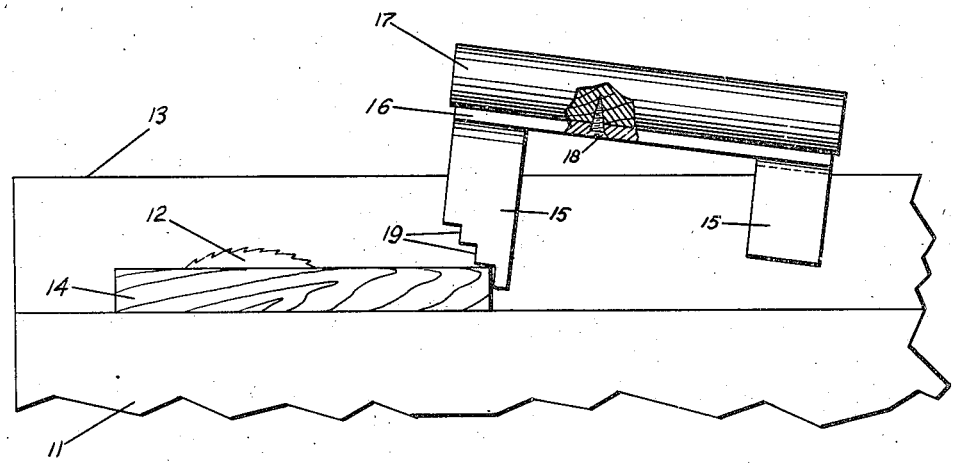

Further objects and advantages of this invention, as well as its construction, arrangement and operation, will be apparent from the following description and claim in connection with the accompanying drawing, in which, Figure 1 is a side elevation of the device of this invention, shown in its relation with a piece of wood being ripped by a power saw.

Figure 2:
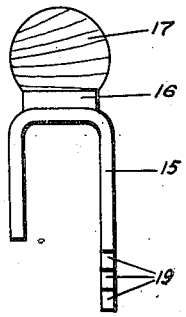

Figure 2 is a front end elevation of the device of this invention.

Referring to the drawing in detail, 11 represents the work table of a conventional power saw, and 12 is the upper portion of a circular saw blade protruding through work table 11. Behind saw blade 12 is a conventional fence or guide 13, parallel to saw blade 12 and spaced therefrom in conformance with the thickness desired in the product of the stock being worked upon, shown as work piece 14.

The device of this invention comprises two U-shaped clips 15, spaced by and joined to plate 16. Hand grip 17 is secured to the surface of plate 16 opposite to that to which are attached clips 15. Clips 15 and plate 16 may be conveniently made of steel and joined together by welding, or in any other conventional manner.

Hand grip 17 is preferably made of wood, although it will be apparent that metal, plastic or other material may be used. If made of wood, hand grip 17 may be affixed to plate 16 by a plurality of wood screws 18, extending into hand grip 17 through countersunk holes provided therefor in plate 16.

One leg of one of clips 15 is longer than the others and is adapted to engage work piece 14 by being formed into a series of steps 19, of approximately 90°.

In operation, the device of this invention is gripped by means of hand grip 17 and placed upon the fence or guide 13, each of clips 15 having one leg on either side of guide 13. It will be apparent that the distance between the legs of clips 15 will desirably be such as to permit the device to slide smoothly on the guide 13 with but little side play. Hand grip 17 is preferably so shaped as to be comfortably gripped by the palm and fingers of the hand, and of a convenient length for that purpose, six inches being a suitable length.

Work piece 14 is then placed against guide 13, and its adjacent corner is engaged by one of steps 19 (Figure 1). With the safety device so engaged with work piece 14, the work piece 14 may be held down against work table 11 and pushed toward saw blade 12 by holding down hand grip 17 and moving it along the top of guide 13. It will be apparent that the horizontal surface of one of steps 19 bears on the top of work piece 14, while the vertical surface of an adjacent step 19 bears on the end of work piece 14, in this manner allowing work piece 14 to be simultaneously held down and impelled toward the saw. Several of steps 19 are provided, to be used with varying thicknesses of work so that plate 16 and hand grip 17 will not ride at too great an angle relative to the top surface of guide 13. It has been found desirable to grip the work piece 14 with the highest of steps 19 which will still keep the lowest horizontal surface of the stepped leg out of contact with the work table 11.

The stepped leg 15 of the safety device of this invention permits work piece 14 to be pushed completely past the saw blade 12, the stepped leg passing between saw blade 12 and guide 13, without the operator's hand ever approaching dangerously close to saw blade 12. By gripping hand grip 17, the operator may maintain a firm grip on the material being cut, and there is no danger of the operator's hand touching the saw in the event the work slips out from under the stepped leg. Using this invention, the operator's hand will be continually pushing in a direction parallel to the top surface of guide 13 and above it, so that in the event the hand should slip from hand grip 17 it will pass considerably above saw blade 12, and not into it.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A safety device for use with circular power saws comprising a rectangular flat plate, a hand grip secured to one surface thereof, and a pair of spaced U-shaped clips secured to the other surface thereof, one leg of one of said clips being provided with a plurality of steps at its extremity.

PATRICK VALENTINE.